United States Patent
Zavadsky et al.

(10) Patent No.: US 7,967,728 B2
(45) Date of Patent: Jun. 28, 2011

(54) WIRELESS GAME CONTROLLER FOR STRENGTH TRAINING AND PHYSIOTHERAPY

(76) Inventors: Vyacheslav Zavadsky, Ottawa (CA); Mykola Sherstyuk, Ottawa (CA)

( * ) Notice: Subject to any disclaimer, the term of this patent is extended or adjusted under 35 U.S.C. 154(b) by 0 days.

(21) Appl. No.: 12/618,680

(22) Filed: Nov. 13, 2009

(65) Prior Publication Data
US 2010/0125026 A1      May 20, 2010

Related U.S. Application Data

(60) Provisional application No. 61/115,082, filed on Nov. 16, 2008.

(51) Int. Cl.
*A63B 71/00*      (2006.01)

(52) U.S. Cl. .................... 482/5; 482/1; 482/8; 482/901; 434/247

(58) Field of Classification Search .................. 482/1–9, 482/900–902; 434/247
See application file for complete search history.

(56) References Cited

U.S. PATENT DOCUMENTS

| | | | |
|---|---|---|---|
| 4,235,437 A | 11/1980 | Ruis | |
| 4,512,567 A | 4/1985 | Phillips | |
| 4,556,216 A | 12/1985 | Pitkanen | |
| 4,880,230 A | 11/1989 | Cook | |
| 4,919,418 A | 4/1990 | Miller | |
| 5,054,771 A | 10/1991 | Manfield | |
| 5,538,486 A | 7/1996 | France | |
| 5,645,513 A | 7/1997 | Haydocy | |
| 5,888,172 A | 3/1999 | Andrus | |
| 6,244,988 B1 | 6/2001 | Delman | |
| D21,663 S | 3/2002 | Mival | |
| 6,582,342 B2 | 6/2003 | Kaufman | |
| 6,749,537 B1 | 6/2004 | Hickman | |
| 6,793,607 B2 | 9/2004 | Neil | |
| 6,872,187 B1 | 3/2005 | Stark | |
| 7,121,982 B2 | 10/2006 | Feldman | |
| 7,156,780 B1* | 1/2007 | Fuchs et al. | 482/92 |
| 7,278,958 B2 | 10/2007 | Morgan | |
| 7,628,730 B1 | 12/2009 | Watterson | |
| 7,637,847 B1* | 12/2009 | Hickman | 482/8 |
| 7,727,117 B2* | 6/2010 | Feldman et al. | 482/8 |

FOREIGN PATENT DOCUMENTS

| WO | WO/91/11221 | 1/1990 |
|---|---|---|
| WO | WO/94/17860 | 8/1994 |

OTHER PUBLICATIONS

U.S. Appl. No. 11/476,991, filed Jun. 27, 2006, Rast.
http://glovepie.org/glovepie.php Glovepie, programmable input emulator. Web page printed on May 18, 2010.

(Continued)

*Primary Examiner* — Glenn Richman

(57) ABSTRACT

Wireless game controller can provide variable resistance during strength training exercise and is coupled with off the shelf video gaming system such as Nintendo WII or personal computer by bluetooth or WiFI connection. The resistance is provided by a motor/generator. Electrical recuperation occurs between eccentric and concentric steps of the exercise, electrical energy is stored in a super capacitor between the steps. Video gaming system is configurable to run exercise software that provide reinforcing game experience, coaching, and physical therapy to the user. Exercise software tracks user's pose using fiduciary marks on the controller and data from 3d accelerometer embedded in the controller. The resistance is computed as a function of one or more the following: exercise type, position, velocity, user profile, and repetition number.

20 Claims, 13 Drawing Sheets

OTHER PUBLICATIONS http://service.nordictrack.com/CustomerService/pdfDownload.do?fileName=NTSY9896.0-248458.pdf&directory=%2fpdf%2f NordictTrackPersonal Trainer III User manual. Downloaded and printed May 25, 2010.

http://www.hcc.cz/article/powerman-3 Web Page printed on May 25, 2010. Koelber powerman 3.

http://www.newbody.de/koelbel/isokinator/isokinator_pro_typ1.php4 Web page printed on May 25, 2010. Kolebel Isokinator pro.

* cited by examiner

WIRELESS GAME CONTROLLER FOR STRENGTH TRAINING AND PHYSIOTHERAPY

CLAIM OF PRIORITY

This application claims priority under 35 USC Section 119(a) from U.S. Provisional Application No. 61/115,082, filed Nov. 16, 2008.

BACKGROUND OF THE INVENTION

Various types of exercise equipment have been developed for muscle building and toning, whether ultimately used as a sport or for physical therapy.

Resistance exercise machines use various sources of resistance (gravity, friction, hydraulics, etc), and a combination of simple machines to convey that resistance to the person using the machine. Each of the simple machines (pulley, lever, wheel, incline) changes the mechanical advantage of the overall machine. Most exercise machines incorporate an Ergo-meter. An Ergo-meter is an apparatus for measuring the work a person exerts while exercising as used in training or medical tests.

Endless-path machines: Running/Walking machines (treadmills), elliptical, glider, climbing machines and stationary bicycles. The treadmill is one of the most popular endless-pass machines. It provides a moving platform with a wide Conveyor belt and an electric motor or a flywheel.

Rowing machines, also named rowers, simulate the body movements of using a rowing boat.

Spine Exercisers: range of fitness machines which comprises two foot striding units and two hand striding units, the Spine Exercisers concentrate on exercising and strengthening the muscles of the spinal column with the spine in free horizontal position.

Spinning ropes, boxing gloves, punching bags for kickboxing and Mixed Martial Arts.

Wii Fit,—an exercise game consisting of activities using the Wii Balance Board peripheral. Training on Wii Fit is divided into four categories: yoga, strength training, aerobics, and balance games. The activities provide a core workout, emphasizing controlled movements rather than overexertion Nautilus® Nitro style equipment: During any exercise, an individuals' strength varies at different points. Other machines don't address this strength curve—instead, the weight remains constant from beginning to end. This can limit muscle recruitment and overall performance. This system is driven by a four-bar linkage system, cam design, or a combination of both, which enables matching of the body's potential increases and decreases in strength.

One of the more common types of exercise equipment is the weight type device which uses weights to provide the necessary resistance. As is well known, these weight type devices have several disadvantages. They are cumbersome to move since they are generally associated with a frame and bench assembly and the weights need to be moved when the equipment is moved. In addition, these devices may cause injury to an inexperienced user since the weights may be dropped suddenly. Further, when weights are lifted an inertia of movement is created which tends to provide unevenness in the operating resistance during the exercising process.

An issue with those machines is that the velocity at which the weight is moved is controlled by the user. Many, if not most, users will move the weight at a velocity which is too fast for optimum muscle development.

Another problem is that the weight which is lowered is the same as the weight which is lifted, even though the muscles are capable of controlled lowering of a larger weight than they can lift. This controlled lowering of a weight, or negative resistance, is the most beneficial exercise for developing strength.

It is also desirable to perform a number of repetitions of each exercise, such as eight to twelve, so as to fatigue the muscle(s) being exercised. Because the capability of the muscles to perform the exercise decreases with each repetition, a weight which is less than the maximum which can be lifted is usually selected for the exercise. A preferred form is to have the weight for each repetition to be the maximum for that repetition; i.e. the weight should change with each repetition.

The therapeutic exercise is the prescription of bodily movement to correct an impairment, improve musculoskeletal function, or maintain a state of well-being. It may vary from highly selected activities restricted to specific muscles or parts of the body, to general and vigorous activities that can return a convalescing patient to the peak of physical condition.

Therapeutic exercise seeks to accomplish the following goals

Correct abnormal movement patterns and co-contractions;

Facilitate movement of limbs in prescribed range

Allow prescribed resistance to be used during each specific exercise.

Improve coordination;

Reduce rigidity

Improve balance

Promote relaxation

Improve muscle strength and maximal voluntary contractile force (MVC)

Improve exercise performance and functional capacity (endurance)

There is considerable effort to couple exercise devices with various video gaming systems (VGS). The shining example of commercial success in this direction is Nintendo's WII fit, which uses balance board and a simple remote controller to drive interactive games and virtual personal training. The success of WII fit is based on the facts that (a) it is a gadget (small, non-expensive) (b) it is easy to use (c) it is coupled with highly interactive and entertaining gaming activity. However, WII Fit does not provide resistance. The resistance exercises are limited to the situations when user's own weight, power cable, or dumbbells are providing resistance. The resistance can not be controlled by VGS Although they are not yet reached the commercial mainstream, there are a lot of designs of aerobic exercise equipment that provide for connection with VGS. The parameters of aerobic exercise equipment (e.g., brake force for a bike or belt speed for a treadmill) are relatively easy to adjust by an electronic control. On other hand, the information on progress of the exercise, e.g. distance or calories burned, is easy to compute and feed to a VGS.

Strength training equipment is more difficult to couple with VGS. First of all, strength training normally require repetitions comprising of concentric and eccentric phases. For an efficient exercise, resistance shall be dependent on one or many of the following: position, repetition number, velocity.

U.S. Pat. No. 7,278,958 to Morgan describes variable resistance strength training machine. The variation of resistance is achieved by mechanically adjusting able pulley system. The adjustment process is initiated by a human. The machine still requires weight stack and frame and does not coupled with a VGS.

U.S. Pat. No. 4,512,567, Phillips, entitled "Exercise Bicycle Apparatus Particularly Adapted for Controlling Video Games," issued Apr. 23, 1985. This patent shows an exercise bicycle that is used to control and fully operate a video game by use of electrical signals. These electrical signals are based on the motion of the handlebars as well as signals proportional to the speed at which the bicycle is being operated. This invention requires the use of an electrical generator and is limited to use with only exercise bicycles.

U.S. Pat. No. 5,645,513 to Haydocy et al. teaches an exercise bike that controls VGS, providing game level rewards for achievement during exercise. It limited to aerobic exercise, requires a bulky exercise machine and does not provide for adjusting of exercise equipment parameters by VGS.

U.S. Pat. No. 6,749,537 to Hickman shows an exercise equipment connected to a local computer, which is in turn connected to a remote system. The patent teaches control of equipment resistance (e.g., exercise bike brake) by a computer system, and provides means for virtual group exercise. The patent does not teach energy recuperation during strength trainings repetitions, nor provide means for reinforcing video game environment nor automated personal training during exercise U.S. Pat. No. 4,235,437, Ruis et al, entitled "Robotic Exercise Machine and Method", discloses a hydraulic driven and controlled apparatus which can be programmed to provide a number of different exercise paths for a user. These paths must be programmed for each new user by a trained technician. The device lacks the simplicity necessary for use in a health club or spa type environment. Moreover, two separately controlled, hydraulically driven links are required for its operation.

U.S. Pat. No. 4,919,418 to Miller, entitled "Computerized drive mechanism for exercise, physical therapy and rehabilitation", discloses a microcontroller based strength training machine that provide for both concentric and eccentric exercise. The control is limited to providing constant velocity during repetitions. The patent does not teach energy recuperation during concentric/eccentric repetitions, nor a connection with VGS. The device is bulky and can not be used as a gadget.

U.S. Pat. No. 4,880,230 to Cook teaches a pre-electronic era pneumatic strength training gadget. Device allows to manually adjust resistance, separately for forward and backward movement. However, this invention does not provide for eccentric exercise, Nautilus style exercise, nor for a connection to VGS.

None of the prior art is concerned with provision of a resistance based strength training closely coupled with a video gaming system that provides a reinforcing video game or a coaching.

DEFINITIONS

A video gaming system (VGS) is an interactive entertainment computer or electronic device that produces a video display signal which can be used with a display device (a television, monitor, etc.) to display a video game or directly on a portable device like smart phone or PDA (Personal Digital Assistant). The term "video game console" is used to distinguish a machine designed for consumers to buy and use solely for playing video games from a personal computer, which has many other functions. In the invention, VGS is operated to run either entertainment (game), physical training or therapeutic software. VGS can be connected to the Internet. The software can be further configured to interact with peer systems or central server to exercise history, settings. In addition to operative connection with the exercise equipment. VGS can be coupled with general purpose (key board, mouse, monitor, joystick, camera, microphone) and specialized (position sensors, accelerometers, voltage sensors, heart rate monitors, blood pressure modules) peripheral devices. The exercise software can either reside on VGS system or on the server, in the later case the use experience will be provided by some thin client (e.g, browser or Java). VGS is distinguishable from specialized exercise computers; as VGS can normally be configured to run non only the exercise software, but other games or general purpose software (media player, internet browser, office productivity suite, etc). For further clarity, WII, XBox, Playstation, Personal computer, netbook, smartphone are examples of VGS, while computer embedded into treadmill for entertainment or control is not a VGS.

Pose tracking is a computer vision technique that allows to trace movement of body parts based on the input from video cameras. The review of various vision based pose tracking techniques can be found in the paper "A Survey of Computer Vision-Based Human Motion Capture" by Thomas B. Moeslund and Erik Granum, Computer Vision and Image Understanding Volume 104, Issues 2-3, November-December 2006, Pages 90-126, which is incorporated here by reference. Fiduciary marks are frequently used to increase the quality of pose tracking and reduce computational requirements. Pose tracking can also be achieved by attaching accelerometers to the body parts of interest and integrating their signals.

Virtual group exercise—users can either see their "virtual images", or see each other by video link, or see each other progress. Users can either exercise simultaneously or independently. The exercise can be organized as a competition or tournament.

Operational characteristics of equipment—force curve (resistance as a function of position, velocity, direction, time, etc; in the simplest case resistance is not variable—the same value regardless of position, velocity, etc), seat height, blocks position, etc.

Strength training is the use of resistance to muscular contraction to build the strength, endurance and size of skeletal muscles. The basic principles of strength training involve a manipulation of the number of repetitions (reps), sets, tempo, exercises and force to cause desired changes in strength, endurance, size or shape by overloading of a group of muscles. Typically, each rep contains a concentric and eccentric steps, where Concentric—exercise where there is movement in the direction force is applied. (For example when a bar bell is lifted from the floor.)

Eccentric—exercise where there is movement in the direction opposite to the direction of the force applied. (For example when a bar bell is lowered to the floor.)

Isokinetic—exercise where the speed of exercise motion is held constant during a dynamic contraction, so that external resistive force varies in response to magnitude of muscular force.

In this invention, strength or muscle training is a process of repeating (reps) a particular "back and forth" move, aiming to quickly exhaust the muscles involved in the move. Static, or isometric training, while the muscles generate force without movement, is not considered as "muscle training" in the scope of this invention. Typically, muscle training involves doing concentric and eccentric motions in turns, although some muscle training regimes involves doing only eccentric or concentric motions (no resistance is provided during opposite move, or resistance switches direction between opposite moves). For further clarity, pushups, squats, pull-ups, biceps push downs, etc are example of muscle/strength training; and rowing, running, stairs climbing and other aerobic exercises are not.

In this invention, strength or muscle training machine is a machine to provide resistance during muscle training. Free weights are not considered to be muscle training machines. For further clarity, plate loaded weight machines, power cables, FreeMotion equipment, Nordic Track personal trainer, Koelbel Powerman and Isokinator are all examples of muscle training machines. Free weights, resistance measuring cables for static training, treadmills, ellipticals, rowing machines, bars for pull ups, push-ups handles, etc are not muscle training machines.

Integrated electrical motor/alternator—an electric mechanical device whose rotor is coupled to a resistance cable. It is used as an electric drive and also as a recuperative brake. Brake energy is converted into electric energy and stored in a battery using an intelligent energy management. Thus, the energy can later be reused for creating of a torque assist or for providing a service driving functions to adjust the resistance cable position and length. The ultra-capacitor could be used instead of or as an addition to the battery. It is capable to deliver up to 10 times the power and longevity of batteries, requires no maintenance and operate reliably in extreme temperatures and vibrations.

Exercise professional: coach, experienced peer or friend, physiotherapist, kinesiologist, personal trainer, etc.

Adjustable resistance—resistance that can be easily adjusted between exercise sets.

Variable resistance—resistance that can be varied within individual rep, for example to emulate Nautilus style equipment or force isokinetic exercise.

BRIEF SUMMARY OF THE INVENTION

The invention is a game controller that can provide variable or adjustable resistance during strength training exercise and therefore forms a muscle training machine. The machine is coupled with off-the shelf video gaming system (VGS). It could be coupled by a Blluetooth, Zigbee, or TCP/IP over a WiFI wireless connection, or through a wired interface such as USB. VGS is off the shelf game console (such as Xbox 360 or WII), or personal computing device, such as desktop computer, notebook, netbook, smartphone, or smartbook.

It is another aspect of this invention that the controller can provide variable resistance by utilizing a hydraulic apparatus, an electrical hoist, or an electrical linear actuator.

It is another aspect of this invention that VGS is configure to run software that supports user during exercise by providing a reinforcing video game experience and caching the use.

It is another aspect of this invention that the said controller has a microcontroller, that manages the resistance provided to user and communicates with VGS. A microcontroller could be a tightly integrated device with wireless interfaces, ADCs and DACs, or on the alternative, a less integrated computing device that communicates through necessary peripherals through a bus. The microcontroller could be a high end application processor or basic 8-bit microcontroller dependent on the embodiment's needs. Microcontroller could be implemented In FPGA or ASIC.

It is aspect of this invention that microcontroller adjust the resistance based on one or more of the following: position, repetition number, type of exercise, user profile, velocity. Microcontroller could either compute the resistance independently, receive functional dependency from VGS, or just receive current force from VGS.

It is another aspect of this invention that the microcontroller transmits to VGS information on the user progress, such as force, velocity, position, number of repetitions, calories burned, or user's vital signs.

It is another aspect of this invention that the resistance is provided by electric motor configured to generate energy during concentric movement and to use energy during eccentric movement, and this energy is recuperated by storing in a super capacitor.

BRIEF DESCRIPTION OF THE DRAWINGS

FIG. 14 Depicts an exemplary VGS screen during exercise, providing the user feedback about pose and velocity.

DETAILED DESCRIPTION OF THE INVENTION

Figure 1:
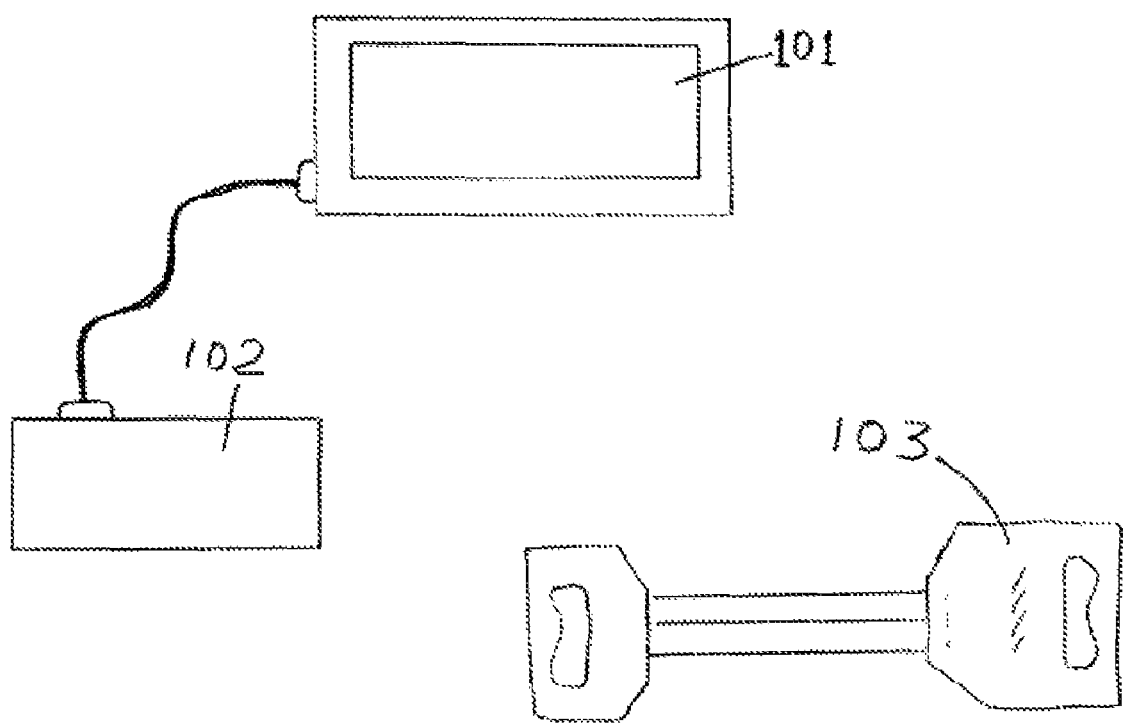
FIG. 1 is overall view of invention when coupled with Nintendo WII.

FIG. 1 depicts the muscle training machine 103 coupled with Nintendo WII 102 video gaming system. Nintendo WII 102 is connected to a TV 101. The muscle training machine 103 is a wireless game controller, further described on FIG. 4.

Figure 2:
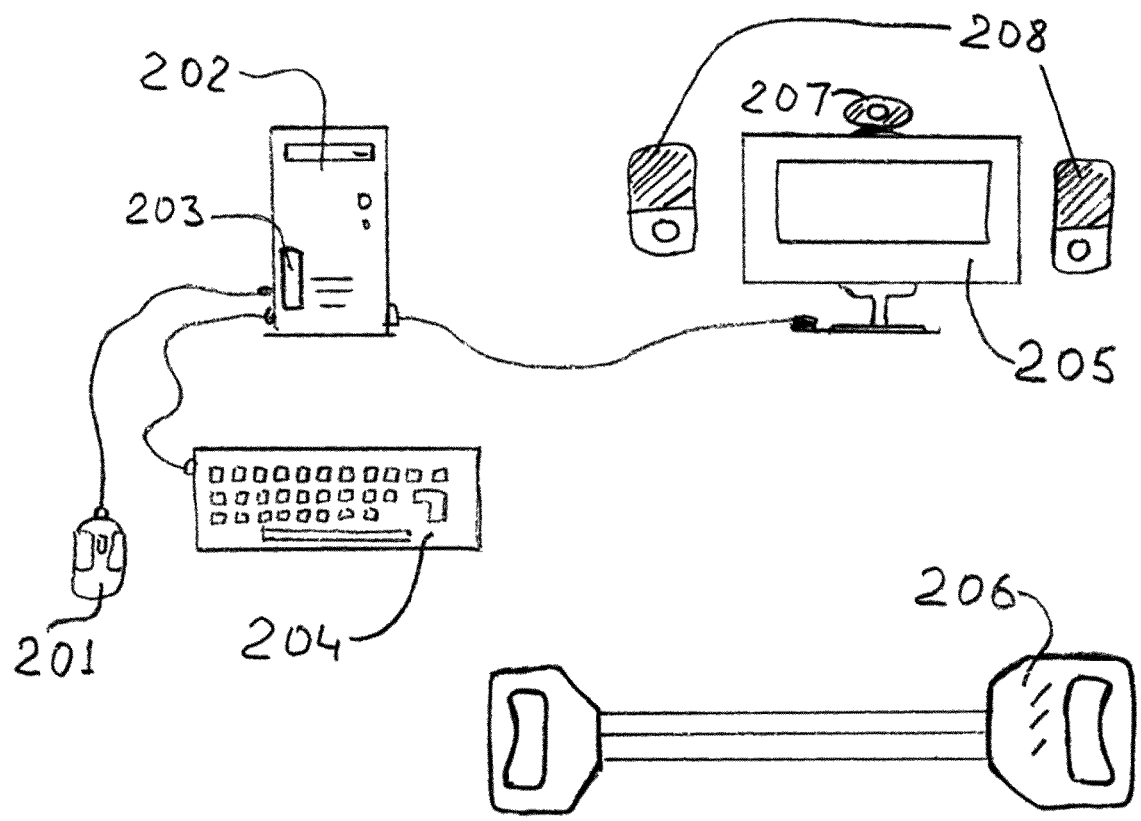
FIG. 2 is overall view of the invention when coupled with a personal computer.

FIG. 2 depicts the muscle training machine 206 coupled with a desktop home computer 202. Computer runs an exercise game, that can established link with the training machine 206 through bluetooth adapter 203. Exercise game takes extra input from keyboard 204 and mouse 201 and provide audio communication to the user through speakers 208 and video communication through monitor 205. Further, exercise software incorporates the pose tracking subsystem based on open source ARToolKitPlus. The pose tracking subsystem relies on web camera 207 for the video input.

Figure 3:
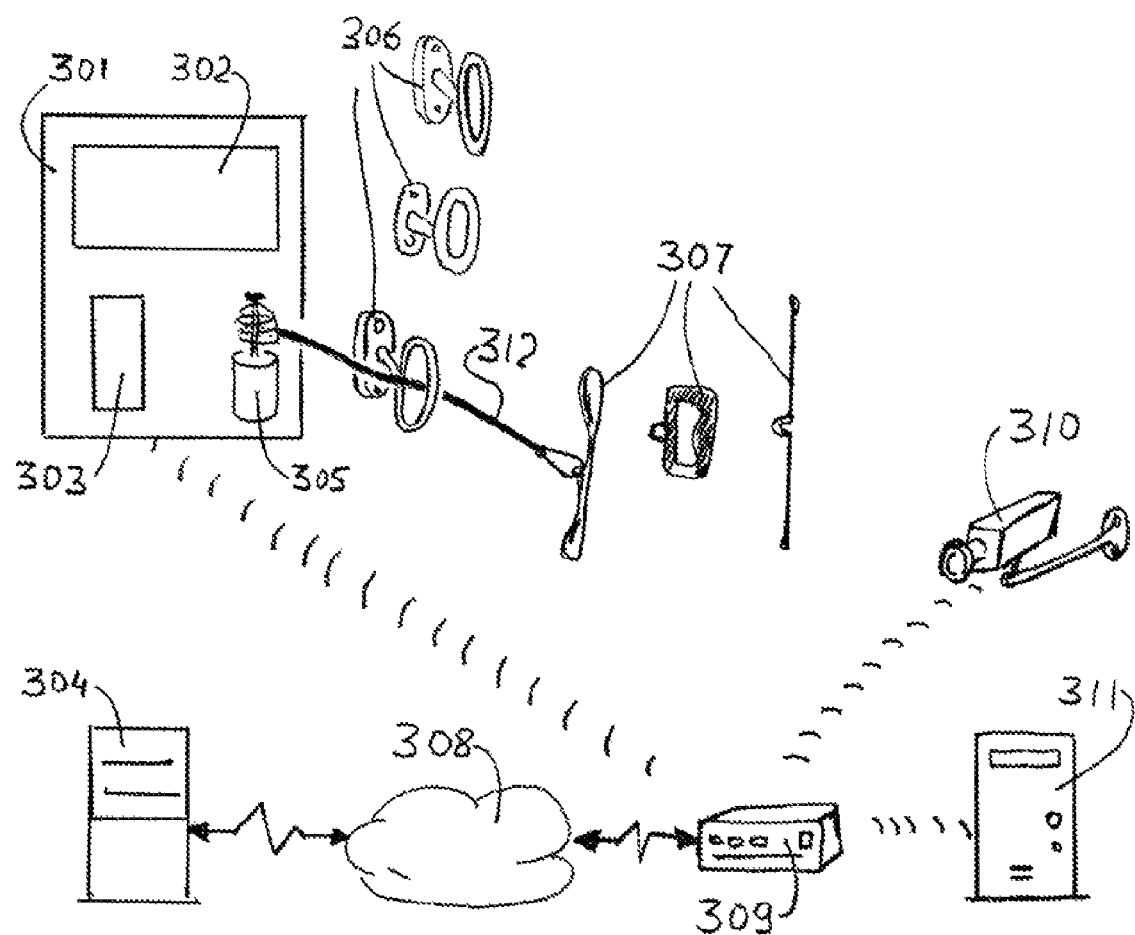
FIG. 3 is an overall view of alternative embodiment.

FIG. 3 depicts the muscle training machine that is loosely coupled with VGS. The machine is embodied as a box 301 with touchscreen 302, hoist with motor 305 and electronic control module 303. Electronic control module 303 is similar in design to the module depicted in FIG. 7, but the microcontroller 702 is replaced with a more powerful Atmel AT91SAM9RL64. On the alternative, a more powerful ARM 11 based microcontroller (such as STMicro STA2065 application processor) is added and communicates with the microcontroller 702 using I2C bus. Further, the bluetooth module 701 is replaced with WIFI module. Other changes apparent to one ordinary skilled in the art might be needed. The box 301 and the blocks 306 are secured to the wall, were blocks 306 are secured at different height. The hoist cable 312 is routed though one of the blocks 306 and is terminated by one of the interchangeable handles 307. Electronic control module 303 establish WiFi connection to wireless router 309, that using the Internet 308 provide TCP/IP connection to the Internet server 304. The microcontroller in ECM runs Windows CE operating system, and using Microsoft Silverlight based user interface, allows to select individual exercises and workouts, adjust the resistance, and track the progress. Using Web Services framework, the software communicates with the Internet server 304, which used to store user profiles and distribute data on workouts and exercises. Local computer 311 might run exercise software. The exercise software and electronic control module 303 mutually will try to discover each other using broadcasting on the local network. If TCP/IP communication is established, the exercise software provides exercise coaching and video games enriching the user experience. Optional Wifi camera 310 provides video stream for the pose tracking, which is implemented on either electronic control module 303 or desktop computer 311.

Figure 4:
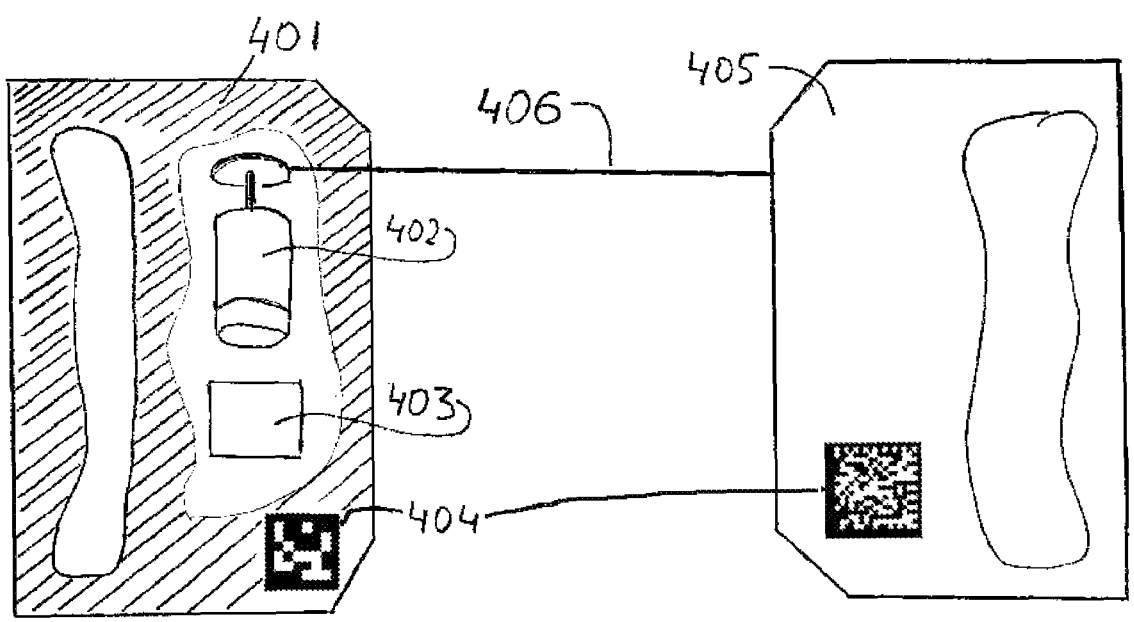
FIG. 4 is a diagram of the invention embodied as a wireless power cable with variable resistance.

FIG. 4 depicts the embodiment of the invention as a wireless game controller appearing as a power cable. Handles 401 and 405 are connected by cable 406. Cable is attached to the host powered by the motor 402 connected with electronic control module 403. To facilitate pose tracking, handles have several pictures of fiduciary marks 404.

Figure 5:
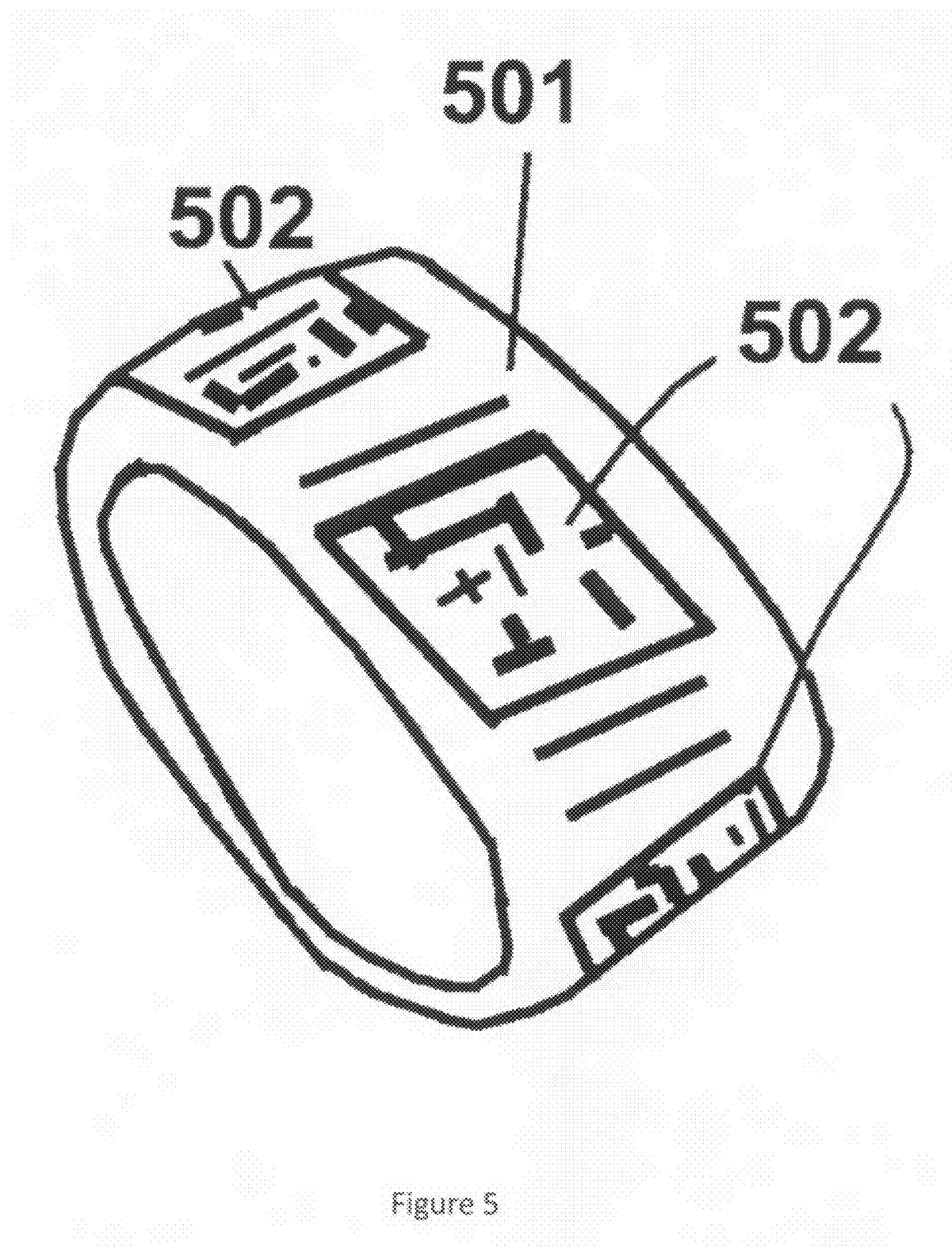
FIG. 5 is an elastic (wrist or ankle) band to assist with video based pose tracking.

FIG. 5 depicts an elastic band 501 with fiduciary marks 502 that can be worn on wrists or ankles during exercise to facilitate pose tracking.

Figure 6:
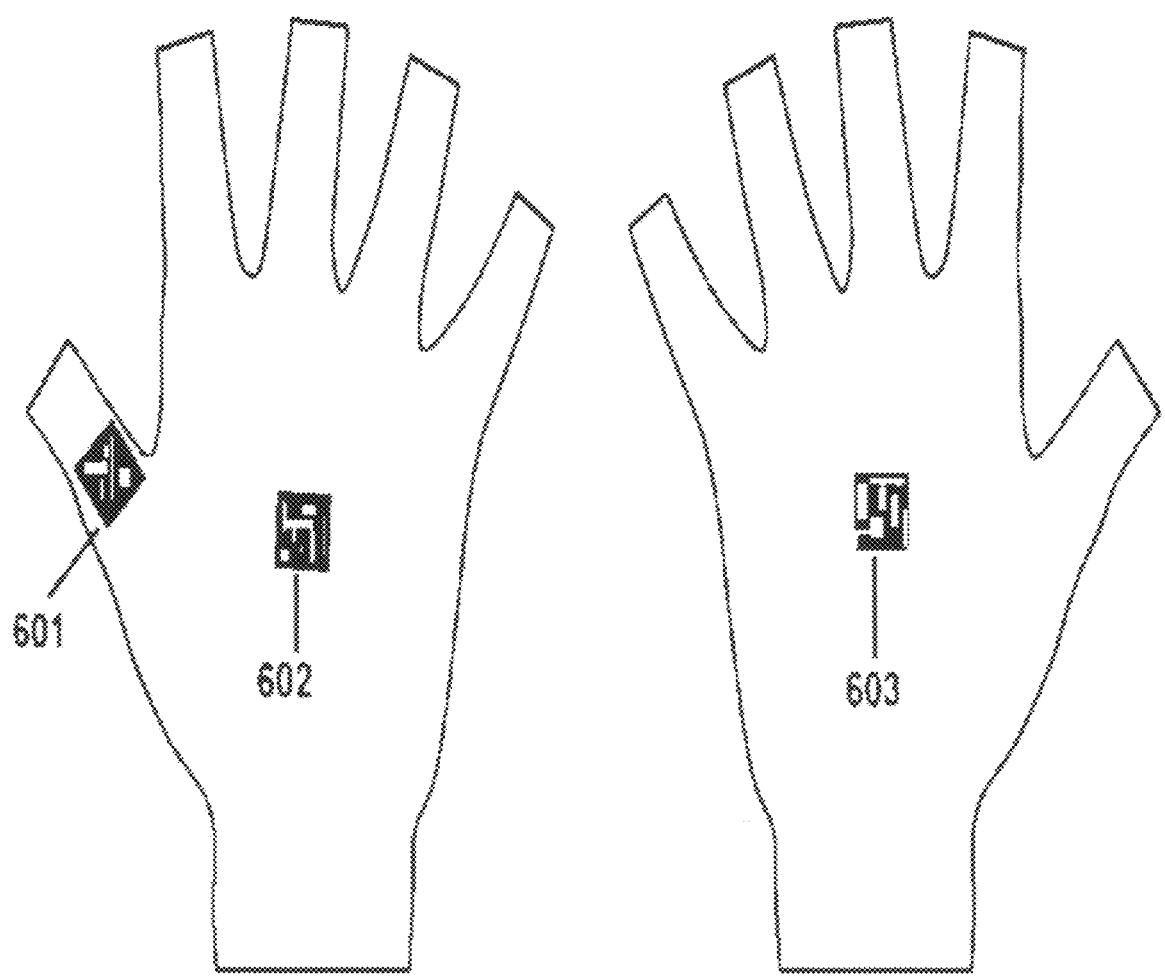
FIG. 6 is a pair of a weight training gloves to assist with video based pose tracking.

FIG. 6 depicts weight training gloves with images of fiduciary marks 601, 602, 603. Fiduciary marks are located to ensure visibility of at least one of the mark regardless of fingers' and arms' position.

Figure 7:
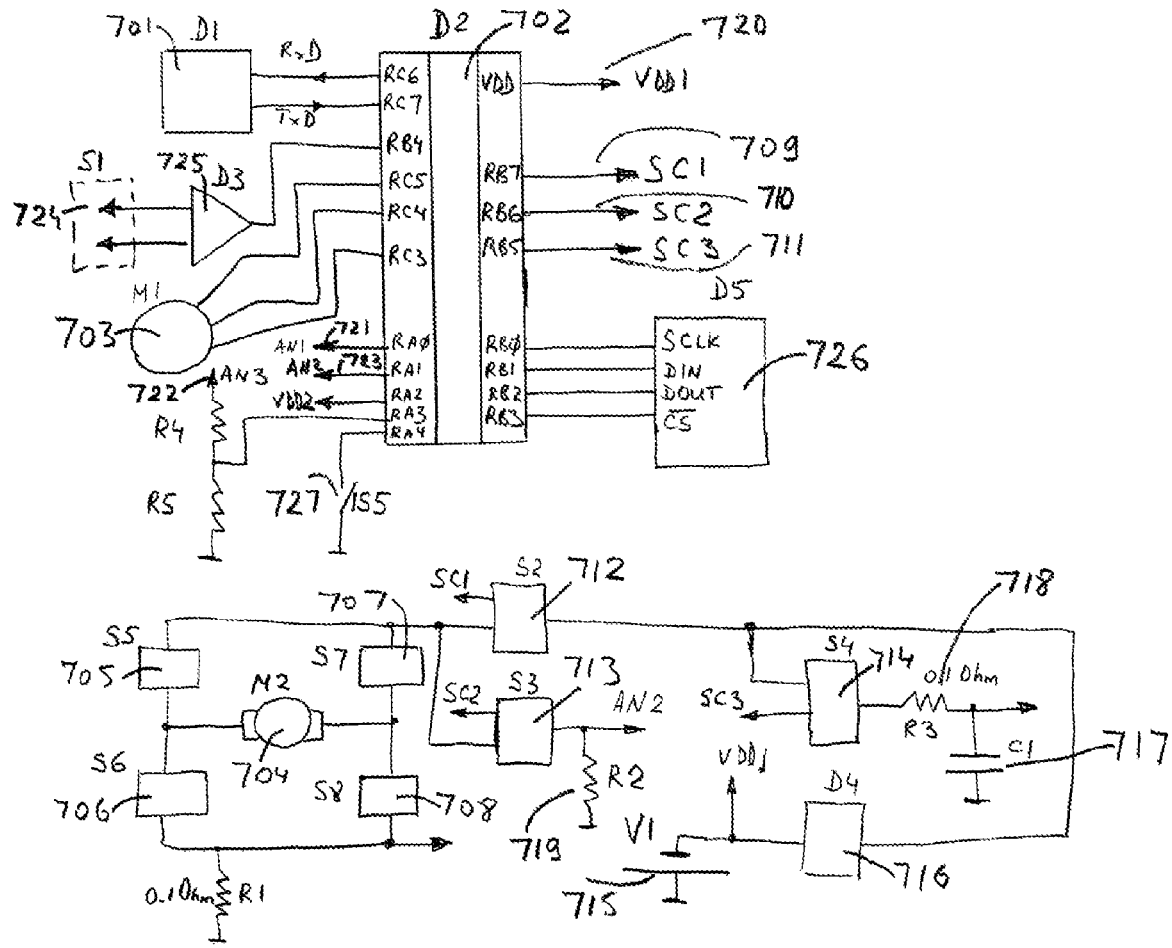
FIG. 7 is a schematic diagram for one of the embodiments.

FIG. 7 depicts the Electronic Control Module (ECM) electric schematics. electric elements specified on the schematic are:

D1 701—LinkMatik 2.0 Bluetooth transceiver
D2 702—Microchip micro controller PIC 16C745
D3 725—National Semiconductor operational amplifier LMC 64
D4 716—Texas Instruments boost regulator TPS 61080
D5 726—Analog Devices Tri-Axis Inertial Sensor ADIS16350
M1 703—Micro Drives optical Encoder E4P—300 series
M2 704—Micro Drives DC gear motor M22P series
C1 717—Maxwell ultra capacitor BCA PO350
S1 724—Hand grip sensor contacts
S2 . . . S8 705 . . . 708—National Semiconductor Power MOSFET IRL 520
IS5 727—Omron round switch A-22-1.

Serial to Bluetooth data link module D1 701 provides connection of the Electronic Control Module (ECM) to a standard bluetooth enabled host (playstation, laptop/desktop computer, PDA, mobile phone. ECM is controlled by firmware of the micro controller D2 702. Communication portion of the irmware supports the communication link between ECM and a host. Serial data input RTS and serial data output TXD of module D1 701 and microcontroller D2 702 are used to serially connect them.

The firmware continuously monitors the output pulses of the incremental optical servo drive shaft encoder M1 703.

Gear motor M2 704 works as the ECM servodrive. Gear motor M2 704 provides a driving torque or provides a resistive torque In active or passive dynamic mode functioning as a controlled brake to maintain the necessary exercise cord tension level. Switches S5 705, S6 706, S7 707, S8 708 are controlling the polarity of pulse width modulated signal (PWM) supplied to the motor 704. Pulse Width Modulation (PWM) control signals SC1 709, SC2 710, SC3 711 are supplied through the power MOSFETs S2 712, S3 713, S4 714 to the gear motor M2 704. S2 712 switch provides PWM of VDD2 amplitude to the gear motor 704. VDD is supplied from the main energy source: rechargeable battery V1 715 through the DC-DC converter D4 716 or from the alternative energy source: ultra capacitor C1 717. The ultra capacitor C1 717 charging/re-charging is controlled by the switch S4 714. Charging current is limited by the resistor R3 718. The ultra capacitor C1 717 provides a high current boosting energy source for the servo drive. In case of rechargeable battery 715 and capacitor 717 been fully charged, the S3 713 switch provides connection of the motor 704 to the damping resistor R2 719. VDD1 720 level of the battery voltage is monitored by the microcontroller D2 702. AN1 voltage signal 721 monitored by the microcontroller 702 represents the gear servo motor 704 current. AN3 722 signal monitored by microcontroller 702 represents the charge voltage of the ultra-capacitor C1 717. Signal AN2 723 monitored by microcontroller 702 represents the dumping resistor current for the Motor M2 704 which could be used for dynamic breaking when negative passive motor torque is used to maintain the level of resistance during the resistance training exercise.

Hand grip sensor S1 724 provides electrical pulses detected from user's hand which allows to calculate current heart beat rate of the user. Pulses are getting amplified by operational amplifier D3 725 and are getting monitored by the microcontroller D2 702. Information about the current user's heart beat rate gets sent to the host computer or video game consul through wireless interface of the module 701. Information about current acceleration of the ECM is provided by the 3D accelerometer D5 726. Video game can show user in real time the better way to perform exercise and at the same time to adjust the resistance level of exercise to maintain the heart beat in the safe range.

Figure 8:
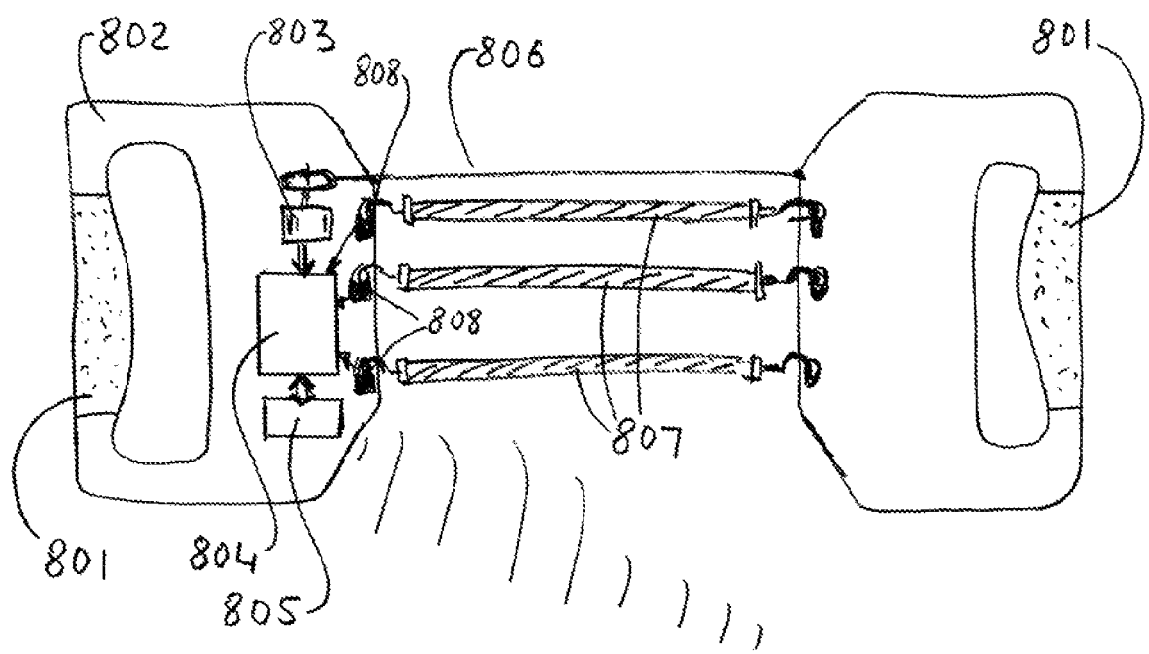
FIG. 8 is a diagram of the invention embodied as a wireless power cable with adjustable resistance.

FIG. 8 depicts wireless game controller for strength training where resistance is provided by dynamic force. The controller comprises 2 handles with embedded heart rate sensors 801. Handles are connected using plurality of springs 807. User can adjust the resistance by changing number springs. In one of the handle, electronic circuit is placed inside the body 802. The circuit contains motor 803 attached to a hoist, electronic control module 804, and battery 805. The electronic control module (ECM) 804 is designed similar to the electronic control modules depicted on FIG. 7, however, the capacity of capacitor 717 is substantially reduced as there is no need to provide substantial resistance. Motor is used just to trace the distance between the handles. There are sensors 808 located in the spots springs 807 attached to the body 802. Those sensors are connected to ECM to enable counting of number of springs used during the exercise. ECM is configured to periodically transmit to VGS information about exercise: number of reps performed, energy used, current distance between handles, the pulse, position and velocity from the accelerometer.

Figure 9:
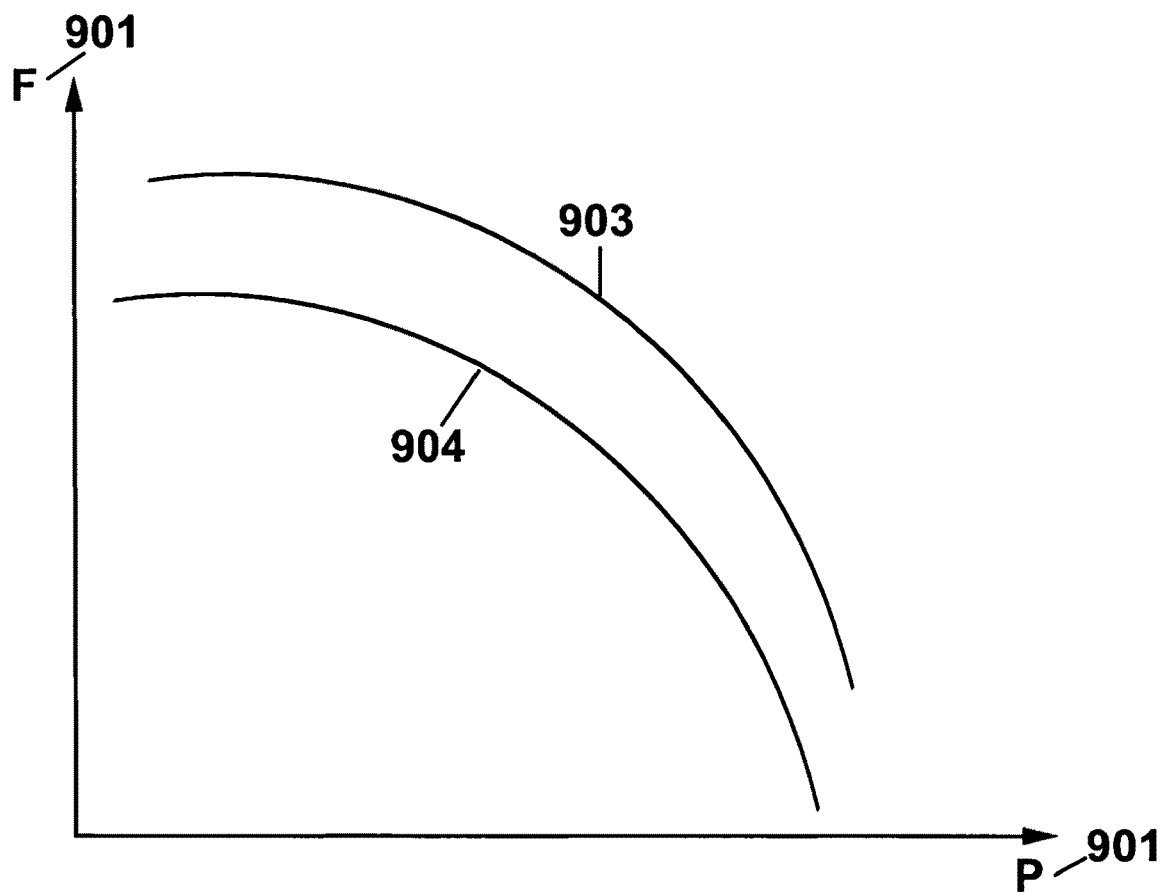
FIG. 9 is a graph of resistance force as a function of position during eccentric and concentric steps.

FIG. 9 depicts exemplary dependence of force 902 from position 901 during one rep of the exercise. During concentric step of the exercise motor is configured to use force 903. Motor generates energy that is stored in the capacitor 717. During eccentric step, motor recuperates energy and is configured to use force 904. Overall energy needed during the eccentric step is smaller then the energy generated during concentric step, which allow for the non-100% recuperation. This is needed in case of wireless embodiment. In the case when the resistance mechanism have access to an AC power supply, the force during eccentric step could be higher then during concentric step.

Figure 10:
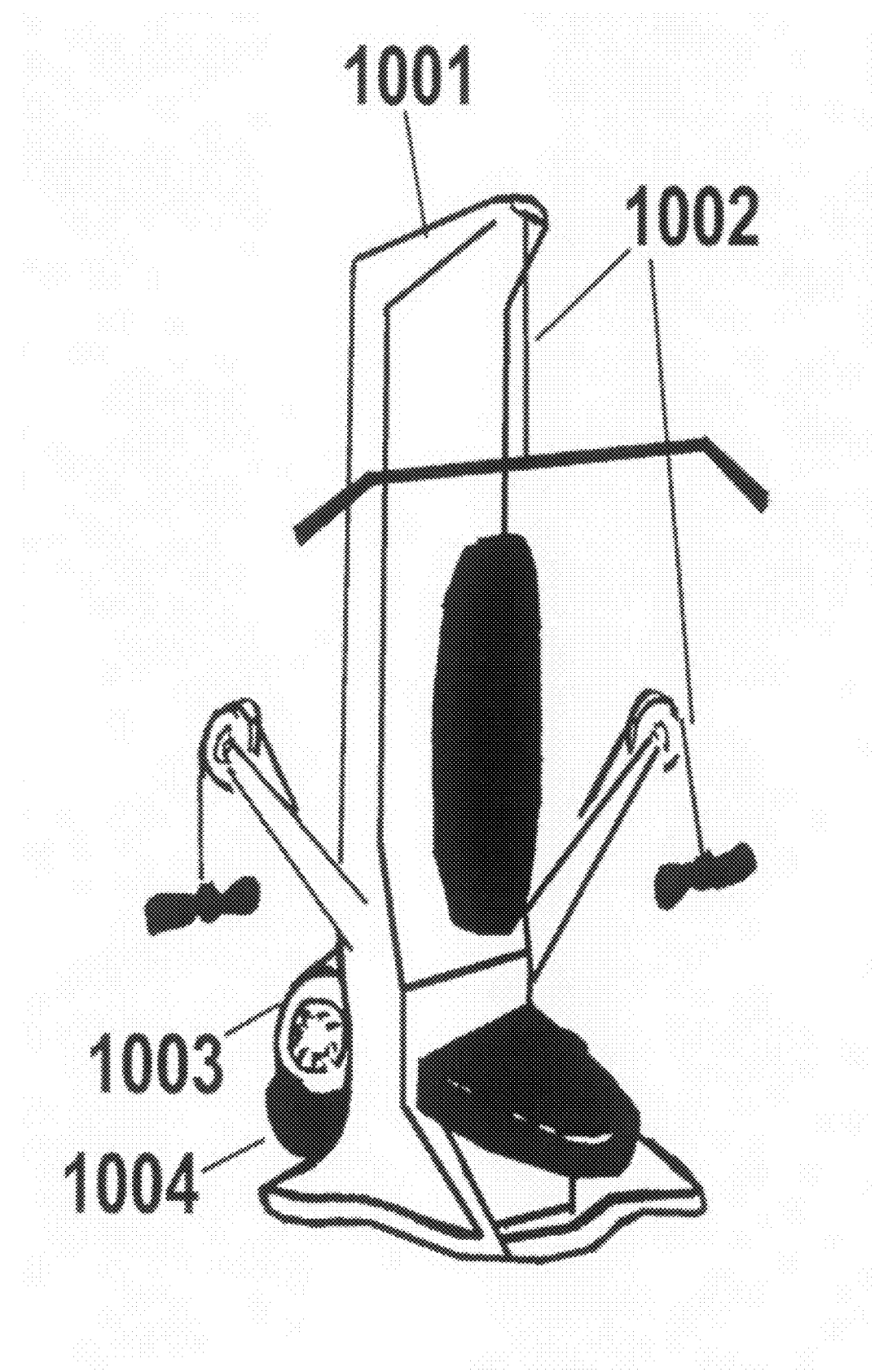
FIG. 10 is a known in the art hoist mechanism to provide variable resistance
Figure 11:
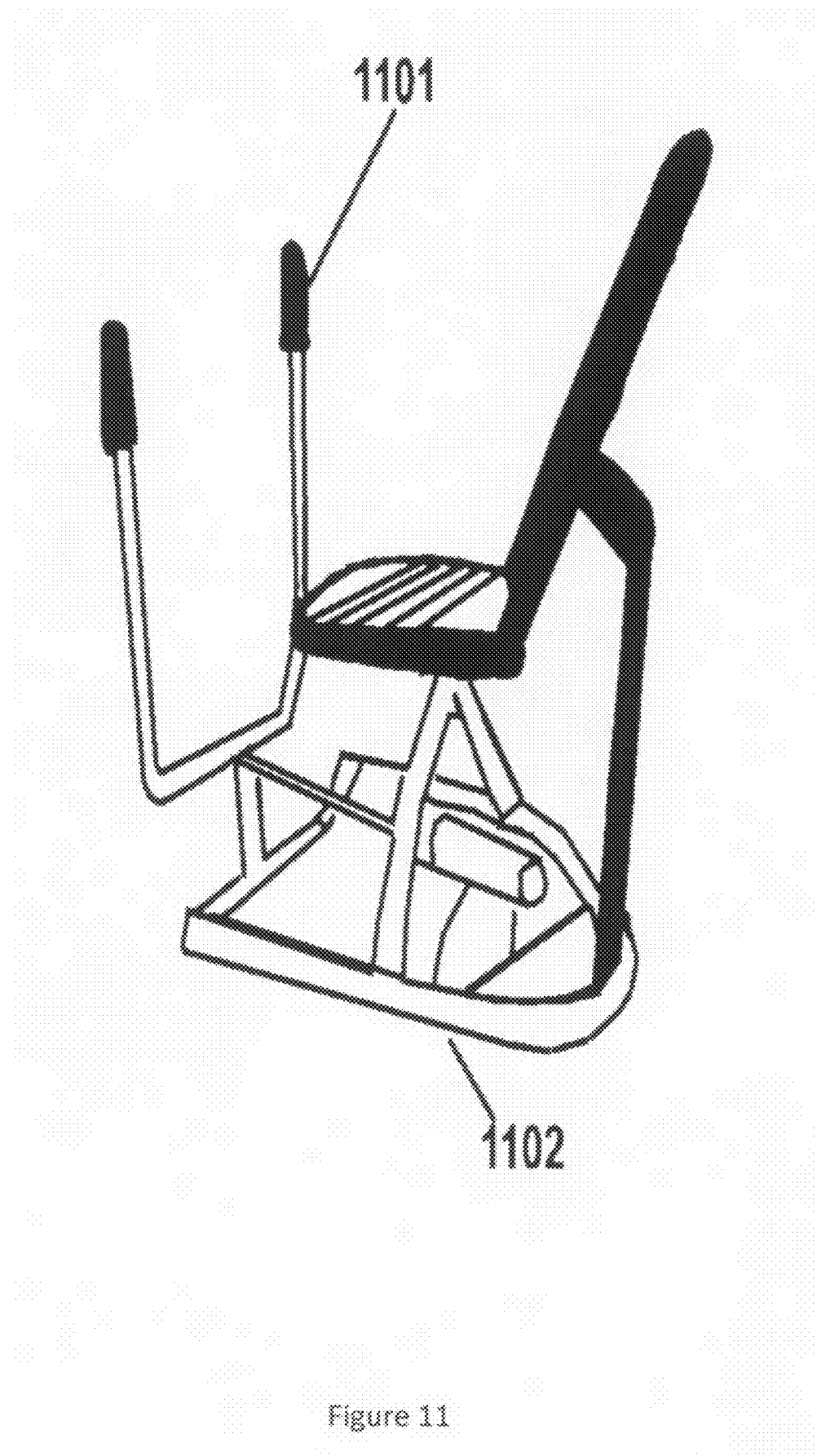
FIG. 11 is a known in the art hydraulic mechanism to provide variable resistance.
Figure 12:
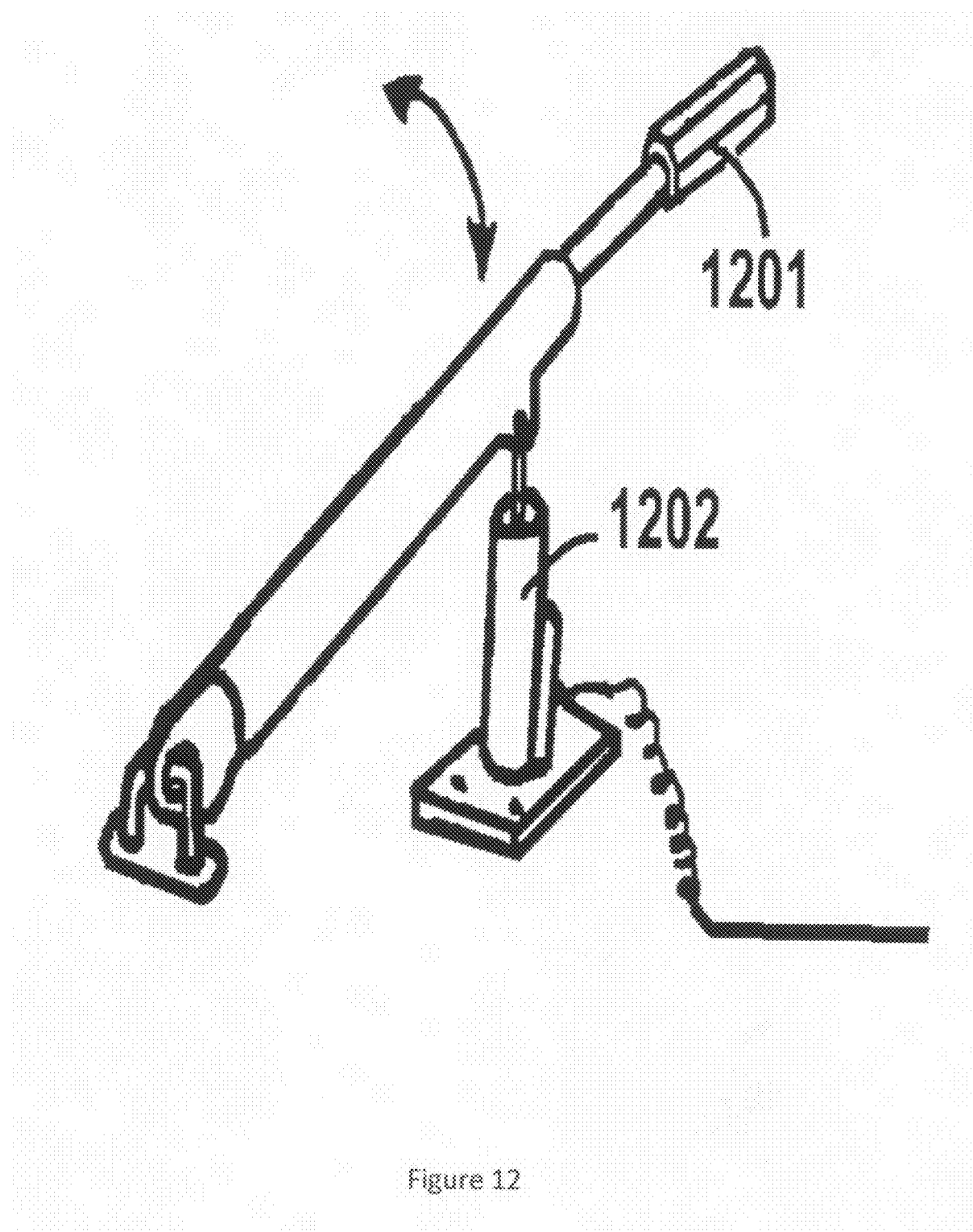
FIG. 12 is a known in the art electric linear actuator mechanism to provide variable resistance.

Resistance can be provided by various means known in the art depicted on FIGS. 10-12. FIG. 10 depicts a weight training machine where resistance is provided by an electrical motor/generator. 1001 is frame, 1002 is cable, 1003 is a gear box and 1004 is an electric motor. FIG. 11 depicts a weight training machine where resistance is provided by a hydraulic mechanism. 1101 is handle, 1102 is hydraulic cylinder. FIG. 11 depicts a weight training machine where resistance is provided by an electrical linear actuator. 1202 is a commercially available actuator, 1201 is an adjustable handle. Those machines can be coupled with VGS by an electrical circuit similar to one depicted on FIG. 7. On the alternatives, frames can be removed, and the variable resistance mechanism can be put into a more gadget like game controller.

Figure 13:
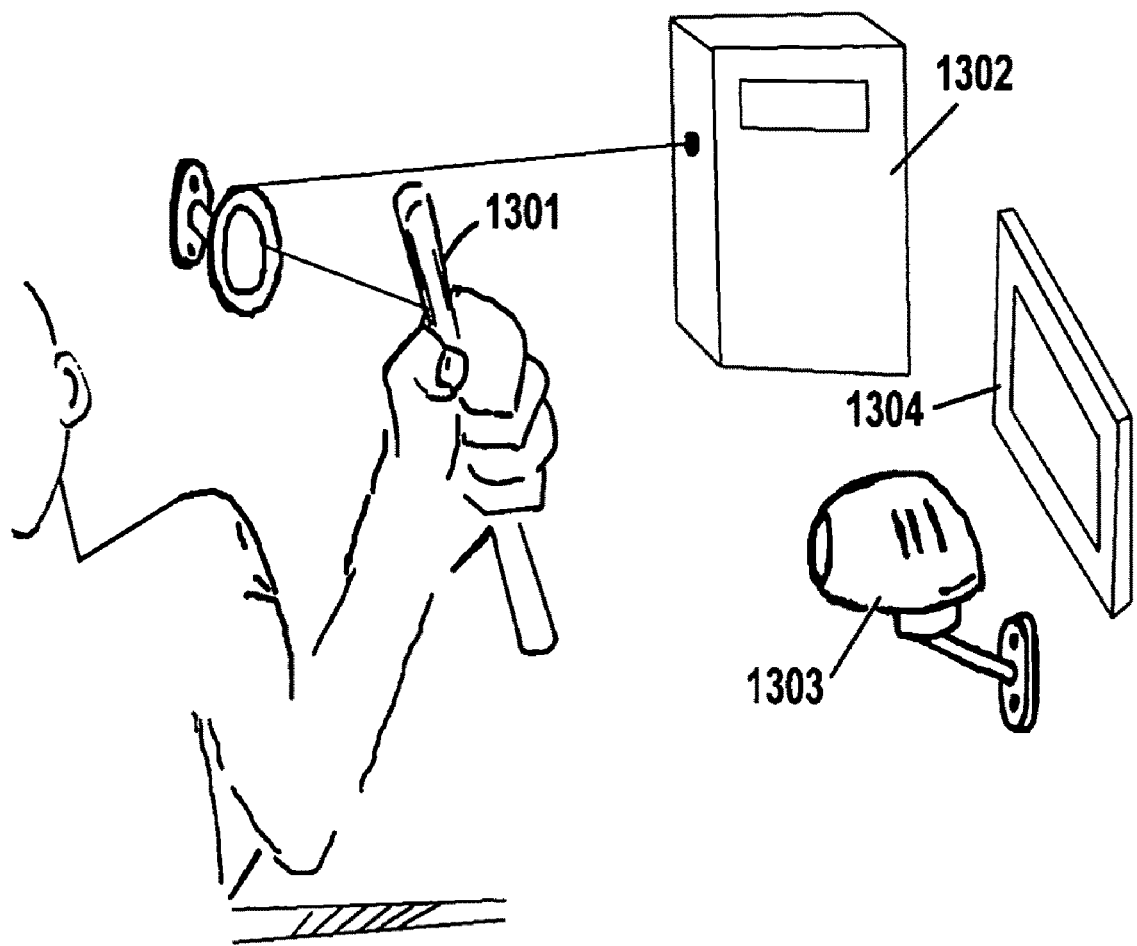
FIG. 13 is an illustration of online wrestling enabled by the invention.

The invention enables various physical exercise based activities, as can be illustrated by the example of remote or virtual online arm wrestling competition depicted on FIG. 13. The arm wrestling competition requires two participants. Each participant places one arm, both put either the right or left, on a surface, with their elbows bent and touching the surface, and they grip handle 1301 connected by the cable to the exercise box 1302 connected through VGS and internet to the same kind of VGS and exercise box at other participant's location. The goal is to pin the other's arm onto the surface, with the winner's arm over the loser's arm. Each participant's position is observed by the web-cam 1303 and gets displayed on the TV monitor 1304. One can approximate the force a person is being able to apply during arm wrestling as a function of position, velocity, and time since the start of exercise. The arm wrestling exercise software on personal computer will provide several virtual opponents, each of them can be characterized by such a force function. During the virtual arm-wrestling, the user will select a partner and difficulty level. The software on VGS will receive from the controller current position and velocity, and using profile force curve and some random factor, calculate desired force and send it to the controller. The user technique (force, speed of the movement, posture, endurance, etc) is analyzed by the software and virtual coaching can be provided to improve user technique. The user force curve can be approximated from his exercise and such can become a part of user's online profile. This enables off-line virtual tournament, when software downloads another user's profile and use it as a virtual partner. In online tournament mode, two VGS exchange through internet current position, velocity, and force. The software is configured to adjust force simultaneously on 2 exercise boxes to synchronize position and velocity. Webcam is used to provide video link between 2 exercise partners.

It is beneficial to provide pose tracking into video game, physical exercise, or physiotherapy. Pose tracking is feasible with off the shelf methods and a higher resolution (2 mp or better) web camera. In the embodiment, fiduciary marks are imprinted on the handles of the controller to facilitate pose tracking. Further, user can wear ankle or wrist bands, or gloves with marks. VGS recognizes the position of fiduciary marks using an open source ARToolKitPlus. Controller integrates data from the accelerometers and periodically transfers the integrated position and velocity to VGS The data are used to enhance the tracking precision. The software utilizes OpenCV motion tracking algorithms to combine the data from un-marked motion tracking, tracking of fiduciary marks, position data from the motor, and accelerometer data into single motion model. Intel integrated performance primitives library is used to facilitate image processing.

The system may be used to enable automated exercise program developed by a physiotherapist. Physiotherapist sets exercise parameters and observe initial session through web cam over Internet. During recovery after a dislocation, it is important to allow joint movement up to certain angle, and provide different resistance during eccentric and concentric phases. The software in VGS is configured to supervise users exercises and provide the controlled level resistance to the patient's hand movement at each stage of the exercise. During exercise, the software displays screen schematically shown on FIG. 14. The software displays computer generated model 1401 of the patient hand with posture adopted from the pose tracking modules. The software displays current velocity 1402 and visual guidance (faster/slower/good) 1403 to the user. The software also displays therapeutic limit 1405 for the user and provide audio/visual warning 1406 in the case the limit is approached. The user progress is stored as a part of online profile. Resistance is provided by the exercise box described on FIG. 3. Physiotherapist periodically performs review of patient's online profile and modifies parameters.

The invention claimed is:

1. Strength training machine,
  comprising at least one moving part that a user moves during an exercise,
  the said machine can provide force at the said moving part, characterized by:
  the said machine is operatively coupled with a VGS;
  the said force can be adjusted, so there is a first magnitude of the said force corresponding to a position of the said moving part, and after the adjustment there is a second magnitude of the said force corresponding to the same position of the said moving part, the first magnitude differs from the second magnitude.

2. Strength training machine as recited in claim 1, wherein the said force is variable, so the graph of the magnitude of the said force during a one movement of the said moving part is non-linear, wherein the graph depicts the said magnitude as a function of the position of the said moving part.

3. Strength training machine as recited in claim 2, wherein the said graphs of the magnitude of the force differs between eccentric and concentric motions.

4. Strength training machine as recited by claim 1, wherein the said force is provided by an electrical hoist.

5. Strength training machine as recited by claim 1, wherein the magnitude of the said force can be adjusted by the said VGS.

6. Strength training machine as recited by claim 2, wherein the said force depends on at least one of the following:
  a. position of the said moving part,
  b. velocity of the said moving part,
  c. repetition number in the said exercise.

7. Strength training machine as recited by claim 1, wherein the said machine is coupled with the VGS over a digital wireless connection.

8. Strength training machine as recited by claim 1, wherein the said machine transfers information about position of the said moving part to the said VGS.

9. Strength training machine,
  operatively coupled with VGS over a digital wireless connection,
  the said machine comprises a moving part that a user moves during an exercise,
  the said machine can provide force at the said moving part,
  the said force can be adjusted, so there is a first magnitude of the said fore corresponding to a position of the said moving part, and after the adjustment, there is a second magnitude of the said force corresponding to the same position of the said moving part, the first magnitude differs from the second magnitude, wherein at least one operational characteristic of the machine is either controlled by VGS or transmitted to VGS.

10. Strength training machine as recited by claim 9 wherein the said operational characteristic is the magnitude of the said force.

11. Strength training machine as recited by claim 9, wherein the said moving part is a handle,
further comprising of a second handle,
the said two handles are connected by a connection,
during the exercise, the user applies a force to at least one handle aiming at increase of the length of the said connection,
the said force provided by the machine counteracts the said increase in the length.

12. A game controller, comprising of at least one moving part, a user moves the said moving part during exercise,
a cord coupled with the said moving part,
a hoist, the said cord is wound on the said hoist,
an electrical motor coupled to the said hoist to provide force in the said moving part by creating a rotation moment in the said hoist,
a micro controller operatively coupled with the said motor,
means to couple the said machine with a VGS,
and operable to allow user to perform
   a first motion of the said moving part, unwinding the said cord from the said hoist and the said force is resisting the said first motion;
   a second motion of the said moving part, winding the said cord on the said hoist and the said force is helping the said second motion.

13. Game controller as recited in claim 12, wherein the said VGS is aware of the position of the said moving part.

14. Game controller as recited in claim 12, wherein the magnitude of the said force varies with the position of the said moving part, so the graph plotting the said magnitude as a function of the said position is non-linear.

15. Game controller as recited in claim 12, wherein the said VGS is ware of the magnitude of the said force.

16. Game controller as recited in claim 15, wherein the said VGS can control the said magnitude.

17. Game controller as recited in claim 12, wherein the said VGS runs software that coaches user on strength training exercises performed using the said roving part.

18. Game controller as recited in claim 12, wherein the said motor uses electrical energy during the second motion.

19. Game controller as recited in claim 18, wherein the said motor generates electrical energy during the first motion.

20. Game controller as recited in claim 19, wherein at least a portion of electrical energy is recuperated.

* * * * *